United States Patent [19]

Sugiyama et al.

[11] Patent Number: 5,720,493
[45] Date of Patent: Feb. 24, 1998

[54] OCCUPANT RESTRAINT SYSTEM

[75] Inventors: Toshiyuki Sugiyama; Michitaka Suzuki, both of Fuji; Kazuyoshi Nishijima, Shibakawa; Kazuhiro Kaneko, Fuji, all of Japan

[73] Assignee: Nihon Plast Co., Ltd., Fuji, Japan

[21] Appl. No.: 768,197

[22] Filed: Dec. 17, 1996

[30] Foreign Application Priority Data

Jun. 14, 1996 [JP] Japan ............................ 8-154601

[51] Int. Cl.⁶ ............................................. B60R 21/20
[52] U.S. Cl. ........................ 280/731; 200/61.54; 200/61.55
[58] Field of Search ......................... 280/731, 728.1, 280/728.3; 200/61.54, 61.55, 61.56, 61.57

[56] References Cited

U.S. PATENT DOCUMENTS

| | | | |
|---|---|---|---|
| 5,308,106 | 5/1994 | Heidorn | 280/728.3 |
| 5,338,059 | 8/1994 | Inoue et al. | 280/728.3 |
| 5,369,232 | 11/1994 | Leonelli | 200/61.54 |
| 5,371,333 | 12/1994 | Kanai et al. | 200/61.54 |
| 5,398,962 | 3/1995 | Kropp | 280/731 |
| 5,399,819 | 3/1995 | Lang et al. | 200/61.54 |
| 5,630,617 | 5/1997 | Hashiba | 280/731 |

FOREIGN PATENT DOCUMENTS

6-312643  11/1994  Japan.

*Primary Examiner*—Christopher P. Ellis
*Attorney, Agent, or Firm*—Foley & Lardner

[57] ABSTRACT

An occupant restraint system including a base plate, a flexible airbag module cover mounted to the baseplate, and a switch assembly which is disposed inside the cover and secured to the base plate. The flexible airbag module cover includes a flap portion forcedly separable from the cover and moveable from a normal closed position to an open position. The flap portion has a horn actuation area. The switch assembly includes a membrane type switch disposed behind the horn actuation area, and a back panel carrying the membrane type switch. The back panel has a switch support portion retaining the membrane type switch and a strap which is secured to the base plate and extends from the switch support portion.

17 Claims, 8 Drawing Sheets

REAR ←          → FRONT

OCCUPANT RESTRAINT SYSTEM

BACKGROUND OF THE INVENTION

The present invention relates to an occupant restraint system including a membrane type switch.

Occupant restraint systems are well known. For example, Japanese Patent Application First Publication No. 6-312643 discloses a driver's side occupant restraint system including a base plate, an airbag module mounted to the base plate, a flexible airbag module cover with a horn actuation area, and a membrane type switch behind the horn actuation area. The base plate is biasedly mounted by a spring to a vehicle steering column shaft to be moveable together with the airbag module relative to the steering column shaft. The spring is so designed to have a given biasing force sufficient to prevent the membrane type switch from being closed due to vibration caused during driving of the vehicle. Accordingly, in this kind of the occupant restraint system, a depressing force larger than the given biasing force must be applied to the horn actuation area. It is likely that a driver cannot obtain good feeling upon depressing the horn actuation area.

U.S. Pat. No. 5,369,232 discloses a driver's side airbag module cover assembly including a flexible airbag module cover which defines a flap portion forcedly moveable in response to deployment of an inflatable airbag. A rigid back panel is attached to a rearside of the flap portion. A membrane type switch is interposed between the flap portion and the back panel. The back panel with the membrane type switch is forcedly moved unitedly with the flap portion upon deployment of the airbag.

There is a demand for an occupant restraint system which has a simple structure and provides an improved performance of a membrane type switch on a flexible airbag module cover, allowing a smooth moving of a flap portion of the cover without being disturbed by the membrane type switch upon deployment of an inflatable airbag.

SUMMARY OF THE INVENTION

According to one aspect of the present invention, there is provided an occupant restraint system including a base plate, a folded inflatable airbag mounted to the base plate, a flexible airbag module cover mounted to the base plate to cover the folded inflatable airbag, the flexible airbag module cover including a flap portion forcedly separable from the flexible airbag module cover and moveable from a normal closed position to an open position in response to inflation of the folded inflatable airbag, the flap portion having a horn actuation area, a membrane type switch disposed behind the horn actuation area, and a back panel disposed between the folded inflatable airbag and the flexible airbag module cover, the back panel having a switch support portion retaining the membrane type switch and a strap secured to the base plate, the strap extending from the switch support portion.

According to another aspect of the present invention, there is provided an occupant restraint system including a base plate, a flexible cover mounted to the base plate, the flexible cover including a flap portion forcedly separable from the flexible cover and moveable from a normal closed position to an open position, the flap portion having a switch actuation area, and a switch assembly including a membrane type switch disposed behind the switch actuation area, and a back panel, the back panel having a switch support portion retaining the membrane type switch and a strap secured to the base plate, the strap extending from the switch support portion.

According to still another aspect of the present invention, there is provided a switch assembly for a flexible airbag module cover, comprising a membrane type switch, and a back panel, the back panel having a switch support portion retaining the membrane type switch and a strap adapted to be secured to the flexible airbag module cover, the strap extending from the switch support portion.

DESCRIPTION OF THE PREFERRED EMBODIMENT

Referring now to FIGS. 1-5, an occupant restraint system 10 according to the present invention which is installed on a vehicle steering wheel 12, will be explained hereinafter.

Figure 1:
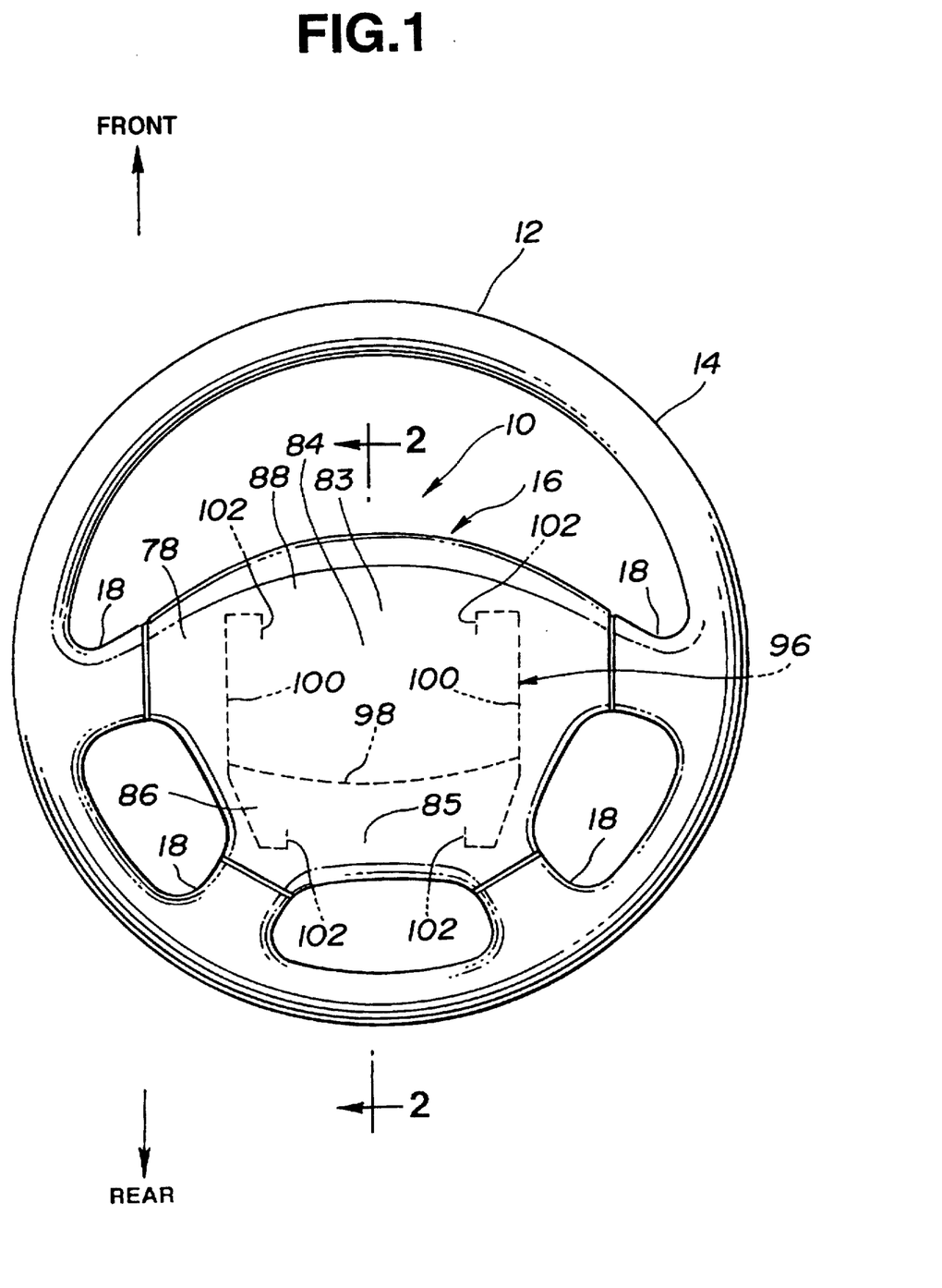
FIG. 1 is a schematic top plan view of a vehicle steering wheel to which an occupant restraint system according to the present invention is mounted.

As illustrated in FIG. 1, the steering wheel 12 includes an annular rim portion 14, a boss portion 16 disposed inside the annular rim portion 14, and a plurality of spoke portions 18 interconnecting the rim portion 14 and the boss portion 16. The boss portion 16 is connected to a boss, not shown, fit to a steering column shaft, not shown. An outer layer made of a soft resin material such as polyurethane foam covers an outer peripheral surface of the rim portion 14 and spoke portions 18 connected together. The occupant restraint system 10 is disposed on upper side of the boss portion 16.

Figure 2:
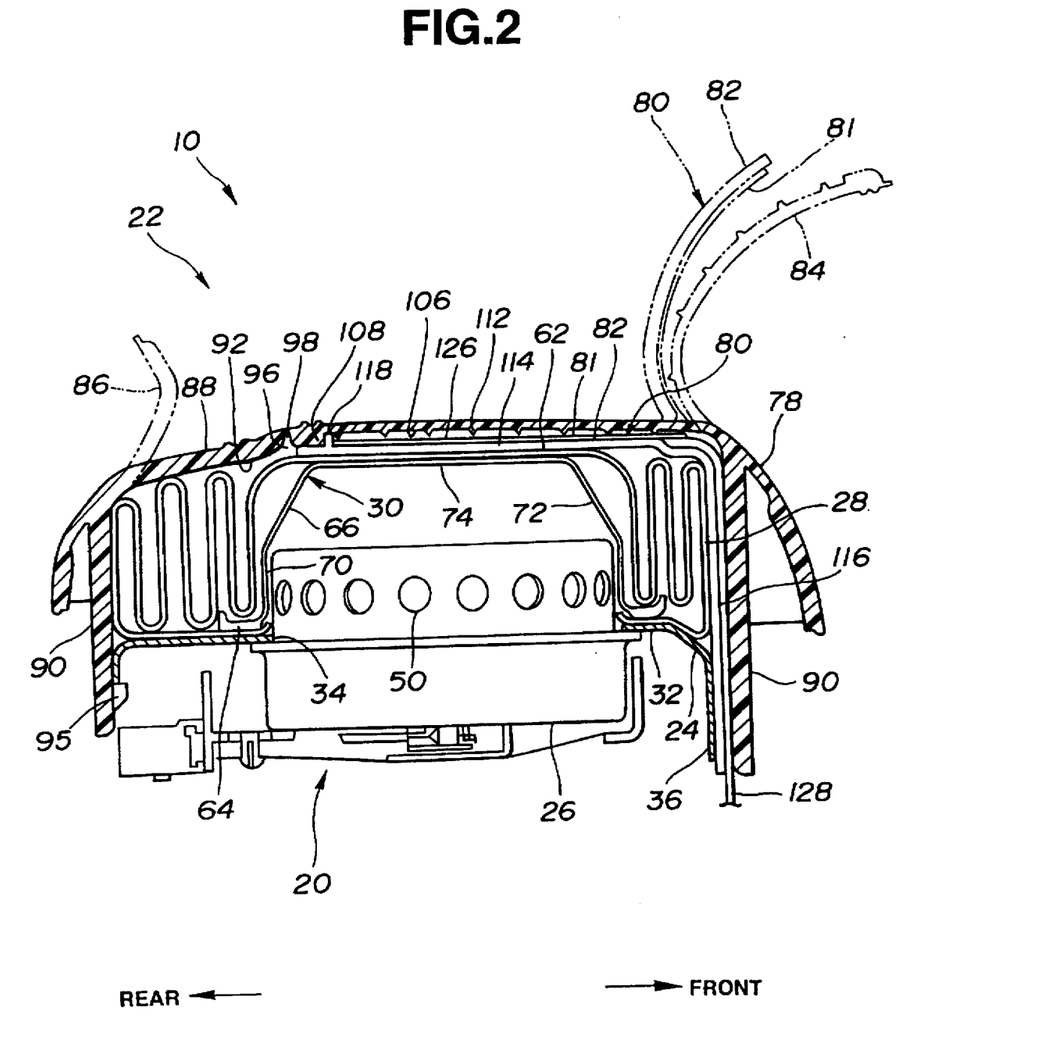
FIG. 2 is a cross section of the occupant restraint system, taken along line 2—2 of FIG. 1, showing an airbag module and an airbag module cover assembly mounted to the airbag module.
Figure 3:
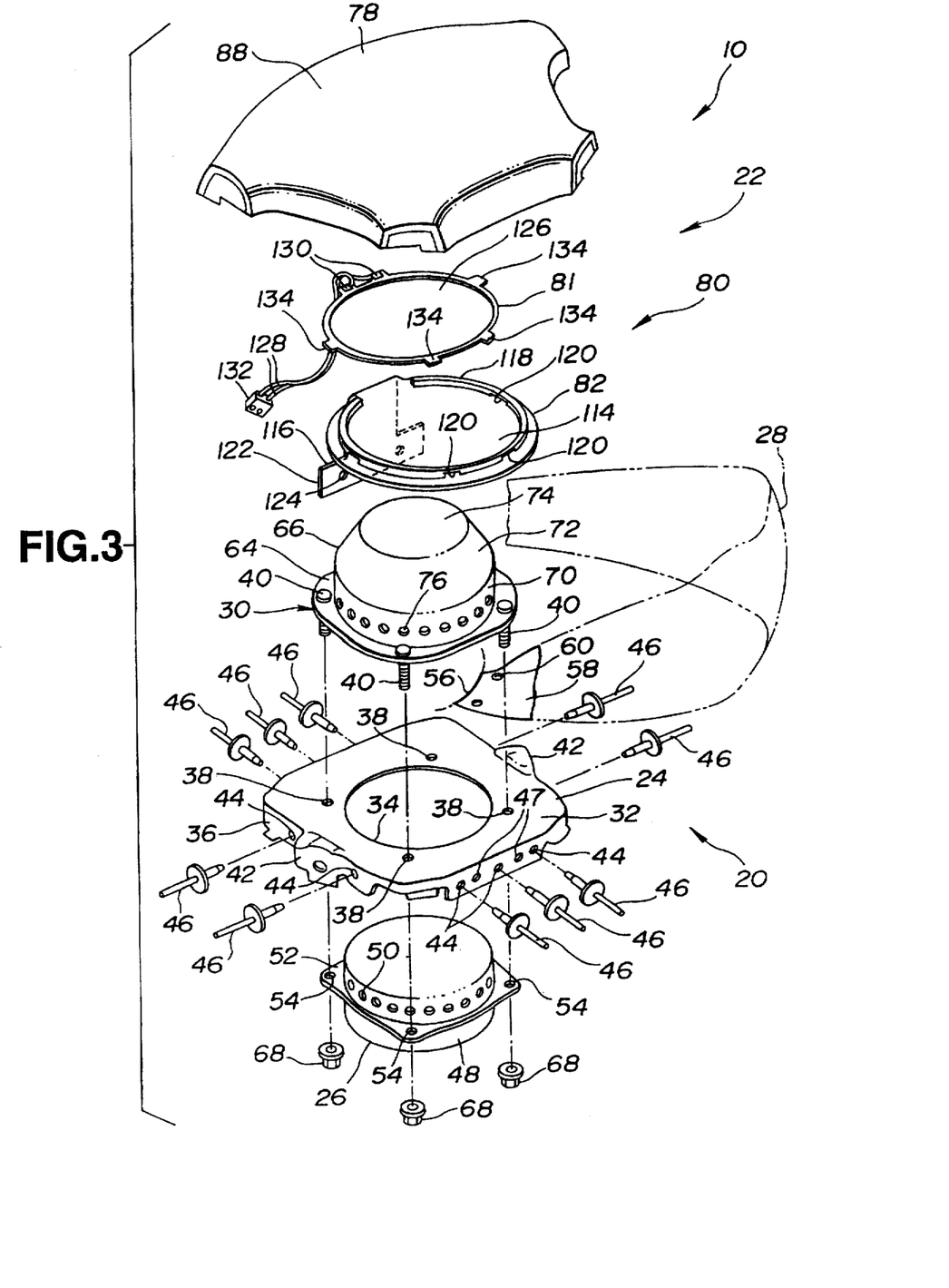
FIG. 3 is an exploded perspective view of the occupant restraint system.

As illustrated in FIGS. 2 and 3, the occupant restraint system 10 includes an airbag module 20 and an airbag module cover assembly 22 mounted to the airbag module 20.

Figure 5:
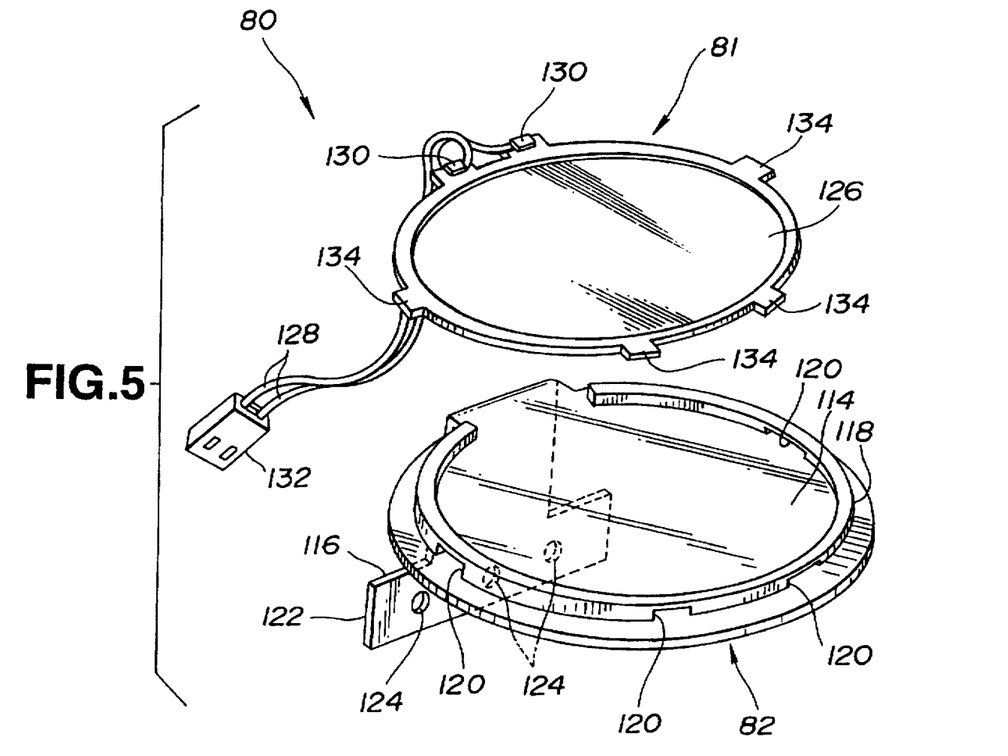
FIG. 5 is an exploded perspective view of a switch assembly, showing a membrane type switch and a back panel.

The airbag module 20 includes a base plate 24, and an inflator 26 and a folded inflatable airbag 28 which are mounted to the base plate 24 by a retainer 30. The base plate 24 is made of steel and has a generally rectangular main portion 32 with an inflator insertion opening 34, and a peripheral depending flange portion 36 extending downward from a peripheral edge of the main portion 32. As best shown in FIG. 5, the main portion 32 has a plurality of holes 38 disposed around the inflator insertion opening 34 and receiving bolts 40. The main portion 32 also has a plurality of rivet holes, not shown, provided around the inflator insertion opening 34. The flange portion 56 has a pair of mounting portions 42 at which the base plate 24 is secured to the boss fitted to the steering column shaft through the corresponding pair of brackets by means of bolts and nuts. Rivet holes 44 are provided adjacent each of the mounting portions 42 and on the front and rear sides of the flange portion 36 in spaced relation to each other. The rivet holes 44 are provided for receiving rivets 46 such that the airbag module cover assembly 22 is secured to the base plate 24. Disposed between the rivet holes 44 of the front and rear sides of the flange portion 36 are pin holes 47 for positioning and temporarily mounting the airbag module cover assembly 22 onto the base plate 24.

The inflator 26 has a generally column-shaped body 48 with a plurality of gas outlets 50 disposed circumferentially at a given distance on an upper portion thereof, and a flange 52 outwardly radially extending from the body 48. The inflator 26 is connected at the flange 36 to the base plate 24 by inserting the bolts 40 into holes 54 aligned with the holes 38 of the base plate 24. The inflator 26 is so constructed as to electrically actuate and generate inert gas, for instance, nitrogen gas, via the gas outlets 50 in response to impact applied to a vehicle body.

The airbag 28 includes two substantially identically configured circular airbag members made of woven fabrics or the like and connected together at their outer circumferential edges. One of the airbag members has a center opening 56 for receiving the upper portion of the body 48 of the inflator 26. A reinforcing airbag member 58 with an opening is attached to inside of the airbag member such that the opening is aligned with the center opening 56. The center opening 56 is aligned with the inflator insertion opening 34 of the base plate 24. A plurality of holes 60 are formed around the center opening 56 of the airbag member to receive the bolts 40. A plurality of rivet holes, not shown, are provided around the center opening 56. A plurality of vent holes, not shown, are provided spaced apart from the center opening 56. Reinforcing airbag members with openings, not shown, are arranged such that the openings are in alignment with the vent holes. The airbag 28 is folded to provide an airbag portion 62 opposed to inside of the airbag module cover assembly 22.

The retainer 30 includes an annular base portion 64 having a generally rectangular outer periphery, and a cup-shaped portion 66 swelled from the base portion 64 toward the airbag module cover assembly 22. The cup-shaped portion 66 is formed integrally with the base portion 64 in this embodiment, but the cup-shaped portion 66 may be formed individually and coupled together. The annular base portion 64 has a plurality of rivet holes, not shown, circumferentially formed by punching. The annular base portion 64 also has a plurality of holes disposed circumferentially equidistantly into which the bolts 40 are inserted and secured to the base portion 64 in such a suitable manner as spot welding, respectively. The bolts 40 are engaged with nuts 68, respectively. The cup-shaped portion 66 includes a cylindrical portion 70 extending from the base portion 64 toward the cover assembly 22, a frusto-conical portion 72 extending from the cylindrical portion 70, and an end wall portion 74 closing an tapered end of the frusto-conical portion 72. The cylindrical portion 70 accommodates the upper portion of the body portion 48 of the inflator 26. The cylindrical portion 70 has a plurality of openings 76 provided corresponding to the gas outlets 50 of the inflator 26.

As best shown in FIG. 2, the airbag 28 has a peripheral edge around the center opening 56 interposed between the annular base portion 64 of the retainer 30 and the main portion 32 of the base plate 24. The airbag 28 is secured at the peripheral edge to the base plate 24 by the bolts 40 and nuts 68 and the rivets. The airbag portion 62 of the airbag 28 is disposed on the end wall portion 74 of the cup-shaped portion 66 of the retainer 30. The remainder portion of the airbag 28 which extends radially outwardly from the airbag portion 62, is disposed around the cup-shaped portion 66 and on the main portion 32 of the base plate 24 and the annular base portion 64 of the retainer 30 in a folded state as indicated in FIG. 2.

As illustrated in FIGS. 2 and 3, the airbag module cover assembly 22 includes a flexible airbag module cover 78 and a switch assembly 80 disposed inside the flexible airbag module cover 78. The switch assembly 80 includes a membrane type switch 81 and a back panel 82 which carries the membrane type switch 81 and provides a rigid pressure surface.

The flexible airbag module cover 78 is mounted to the base plate 24 to cover the folded inflatable airbag 28. The flexible airbag module cover 78 includes a tongue portion forcedly separable from the cover 78 by the airbag portion 62 and a flap portion integrally hinged to the tongue portion and forcedly separable from the cover 78 by the airbag portion 62 for movement from a normal closed position to an open position in response to inflation and deployment of the folded inflatable airbag 28. The tongue portion has a hinge line and is rotatable about the hinge line upon inflation of the airbag 28. The tongue portion and the flap portion are defined by an easy-to-break line designed to be more fractureable than the remainder of the cover 78.

Figure 4:
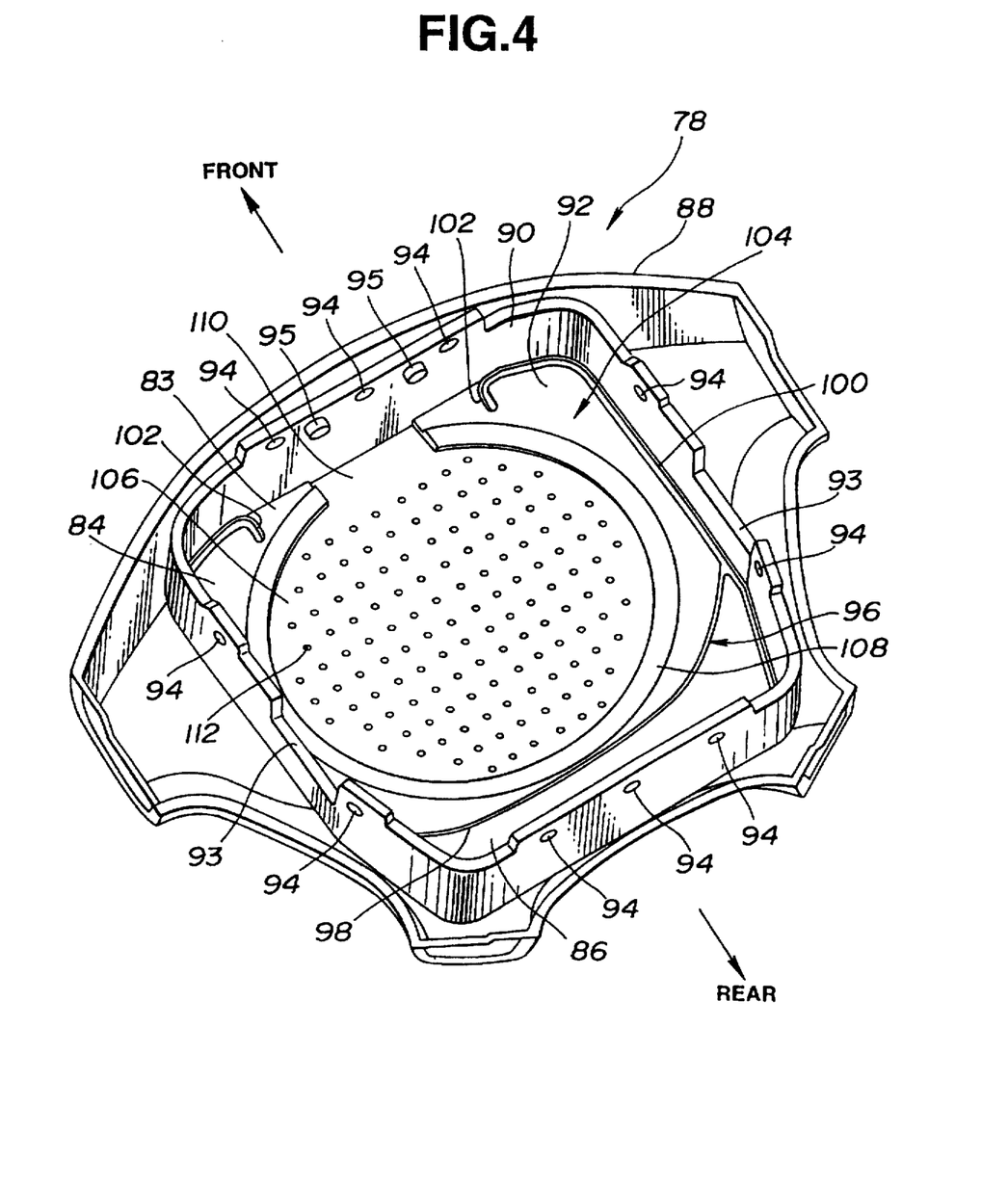
FIG. 4 is a bottom perspective view of a flexible airbag module cover.

In this embodiment, the cover 78 has a pair of tongue portions 83 and 85 and a pair of flap portions 84 and 86 integrally hinged to the tongue portions 83 and 85, which are disposed on the front and rear sides as shown in FIG. 1. Specifically, the flexible airbag module cover 78 is made of soft resin material such as thermoplastic elastomer and integrally formed by injection molding. The cover 78 includes a lid portion 88 so disposed as to cover the boss portion 16 and a part of each spoke portion 18 of the steering wheel 12 as shown in FIG. 1. The lid portion 88 is configurationally harmonized with the outer layer of the steering wheel 12 and curved upwardly as viewed in FIG. 2. The cover 78 also includes a mounting portion 90 extending downward as viewed in FIG. 2, from an inner surface 92 of the lid portion 88. As best shown in FIG. 4, the mounting portion 90 is in the form of a hollow cylindrical wall having a generally rectangular shape and has two pairs of opposed wall portions including front and rear wall portions and opposite side wall portions joining with the front and rear wall portions. The mounting portion 90 has a plurality of throughholes 94 provided in substantially alignment with the rivet holes 44 of the flange portion 36 of the base plate 24. The mounting portion 90 has, at one of the two pairs of opposed wall portions, cutouts 93 engageable with the mounting portions 42 of the base plate 24, and at the other of the two pairs thereof, pins 95 engageable with the pin holes 47 of the base plate 24. The cover 78 is fixed at the mounting portion 90 to the base wall 24 by inserting the rivets 46 into the throughholes 94 and the rivet holes 44 and staking same.

The lid portion 88 is provided with the front and rear tongue portions 83 and 85 and the front and rear flap portions 84 and 86 integrally hinged to the tongue portions 83 and 85. When the folded inflatable airbag 28 inflates and deploys, the tongue portions 83 and 85 with the flap portions 84 and 86 are forcedly separable from the lid portion 88 by the airbag portion 62 of the airbag 28 and moveable from the normal closed position as indicated in a solid line of FIG. 2 to the open position as indicated in a phantom line of FIG. 2. The tongue portions 83 and 85 and the flap portions 84 and 86 are defined by an easy-to-break line 96 of a generally H shape shown in FIG. 1. The easy-to-break line 96 is in the form of groove provided on the inner surface 92 of the lid portion 88. The H-shaped easy-to-break line 96 includes a laterally extending portion 98, two traversing portions 100 respectively extending angularly from opposite ends of the laterally extending portion 98 away from the laterally extending portion 98, and a stop portion 102 extending angularly from an end of each of the traversing portions 100. The laterally extending portion 98 and the traversing portions 100 cooperate to define the flap portions 84 and 86. The stop portions 102 are opposed to each other within each of the flap portions 84 and 86 and define the tongue portion 83 and 85. Each of the stop portion 102 prevents split of the lid portion 88 from propagating beyond the terminal end of each traversing portion 100, serving for restraining removal of the tongue portions 83 and 85 with the flap portions 84 and 86 from the lid portion 88.

In this embodiment, the laterally extending portion 98 is disposed offset rearward from a center part of the lid portion 88 and curved rearward, as seen from FIG. 1. As best shown in FIG. 4, each of the traversing portions 100 extends inside along the side wall portion of the mounting portion 90 and along curved corner portions where the side wall portion joins with the front and rear wall portions, and terminates inside the front and rear wall portions. The stop portion 102 extends in parallel to the traversing portion 100 and terminates before the laterally extending portion 98.

As best shown in FIG. 4, the front flap portion 84 has a switch assembly receptacle portion 104, on the inner surface 92, receiving the switch assembly 80. The switch assembly receptacle portion 104 includes a generally ellipsoidal main receptacle portion 106, a generally C-shaped rib 108 enclosing the main receptacle portion 106, and a strap receptacle portion 110 extending forward from the main receptacle portion 106. The main receptacle portion 106 is a recessed portion reduced in thickness to define a horn actuation area. The horn actuation area is flexible in response to application of pressure thereto. The rib 108 projects from the inner surface 92 and extends downward as viewed in FIG. 2, therefrom to be opposed to the back panel 82. The strap receptacle portion 110 has same thickness as the reduced thickness of the main receptacle portion and is disposed within the front tongue portion 83. The switch assembly receptacle portion 104 has a plurality of projections 112 extending downward as viewed in FIG. 2, from the inner surface 92 and opposed to the membrane type switch 81 on the back panel 82. The projections 112 are spaced apart at a predetermined distance from each other and have distal end edges cooperating with each other to define a flat or generally part cylindrical imaginary surface. The provision of the projections 112 serves for increasing a performance of the membrane type switch 81 in response to pressure applied to the horn actuation area and improving an operating feeling of a driver of the vehicle.

As best shown in FIG. 5, the back panel 82 includes a generally ellipsoidal-shaped switch support portion 114 and a strap 116 extending downward as viewed in FIG. 5, from the switch support portion 114. The strap 116 is formed integrally with the switch support portion 114 and has a bend to form a generally L-shaped side view. The back panel 82 is made of same resin material as the material of the cover 78. The back panel 82 is so designed as to be not less than the lid portion 88 of the cover 78 in rigidity. The switch support portion 114 has a generally C-shaped rib 118 extending upward as viewed in FIG. 5, from the switch support portion 114 and disposed radially inside and along a circumferential edge thereof. The rib 118 has a plurality of tab insertion openings 120 disposed at predetermined positions in spaced relation. The strap 116 has at the bend a hinge line about which the switch support portion 114 is rotatable in response to deployment of the folded inflatable airbag 28. The strap 116 is of a generally reversed T shape as shown in FIG. 5 and has at its distal end a fixing portion 122 formed with throughholes 124 spaced apart from each other at a predetermined distance. The throughholes 124 are substantially in alignment with the through-holes 94 of the cover 78 and the rivet holes 44 of the base plate 24. The back panel 82 is made of a resin such as olefine-based thermoplastic elastomer, polyester-based thermoplastic elastomer, polyamide-based thermoplastic elastomer, stylene-based thermoplastic elastomer, thermoplastic polyurethane resin, two component-type reactive polyurethane resin, or the like. The back panel 82 may be made of one of various materials including glass cloth, aramid net, sheet metal such as iron, aluminum, or the like. The back panel 82 may also be made of an appropriate combination of the resin and the material. Further, the back panel may be an insert having a resin coat and including a strap and a switch support portion connected to the strap by means of hinge.

The membrane type switch 81 includes a generally ellipsoidal-shaped membranous body 126 disposed on the switch support portion 114. Specifically, the body 126 of the membrane type switch 81 is composed of an upper plate, a lower plate overlapped on the upper plate, and a spacer interposed therebetween. The upper and lower plates are in the form of film made of a suitable resin material, for instance, polyethylene terephthalate (PET). The upper and lower plates have on their opposed surfaces electrical conductive coating layers, for example, copper foil applied to the opposed surfaces by a suitable method such as bonding. The spacer is in the form of a plurality of pellet-shaped protrusions made of an elastic insulating material such as silicone rubber and spaced apart from each other at a predetermined distance. Electrical conductive leads 128 are electrically connected with the electrical conductive coating layers via terminal portions 130, respectively. The leads 128 are connected via a connector 132 to electrical circuitry provided on the vehicle body for actuating a horn. If pressure is applied to the body 126 of the membrane type switch 81, it is caused a contact between the conductive coating layers on the upper and lower plates whereby the circuit is closed or completed to actuate the horn.

The body 126 of the membrane type switch 81 has a peripheral edge substantially engageable with an inner radial periphery of the rib 118 of the switch support portion 114 of the back panel 82. A plurality of tabs 134 extend radially and outwardly from the peripheral edge of the body 126. The tabs 134 are circumferentially spaced apart from each other and engageable with the tab insertion openings 120 of the rib 118 of the back panel 82. The tabs 134 and the tab insertion openings 120 act as coupling members for coupling the membrane type switch 81 and the back panel 82. By this coupling of the tabs 134 with the tab insertion openings 120 and the engagement of the peripheral edge of the body 126 with the rib 118 and, the membrane type switch 81 is prevented from being displaced laterally and vertically relative to the back panel 82 and is held in place on the back panel 82. Thus, positioning of the membrane type switch 81 relative to the back panel 82 is performed readily and accurately and therefore assembling operation of the switch assembly 80 is facilitated.

The provision of the switch assembly receptacle portion 104 on the front flap portion 84 of the cover 78 prevents displacement of the switch assembly 80 thereon, facilitating mounting the switch assembly 80 to the cover 78 to form the airbag module cover assembly 22.

At the mounting state of the airbag module cover assembly 22 to the base plate 24 as shown in FIG. 2, the switch assembly 80 is disposed in the switch assembly receptacle portion 104 of the front flap portion 84 of the cover 78. The switch support portion 114 of the back panel 82 and the membrane type switch 81 thereon are disposed in the main receptacle portion 106 of the switch assembly receptacle portion 104. The switch support portion 114 with the membrane type switch 81 is disposed between the front flap portion 84 and the end wall portion 74 of the cup-shaped portion 66 of the retainer 30. The switch support portion 114 with the membrane type switch 81 is supported by the end wall portion 74 via the airbag portion 62 interposed between the switch support portion 114 and the end wall portion 74. The airbag portion 62 is preferably a single layer of the airbag member. The membrane type switch 81 is disposed adjacent the imaginary surface provided by the projections 112 on the main receptacle portion 106 of the cover 78. The rib 118 of the switch support portion 114 is disposed radially inside the rib 108 of the switch assembly receptacle portion 104. The rib 108 has a bottom surface engaged with a radially extending circumferential surface of the switch support portion 114 which is disposed outside the rib 118. The strap 116 of the back panel 82 is received in the strap receptacle portion 110 of the switch assembly receptacle portion 104 of the cover 78. The strap 116 extends via a corner portion where the front wall portion of the mounting portion 90 joins with the lid portion 88, along the front wall portion thereof. The strap 116 is interposed between the flange portion 36 of the base plate 24 and the front wall portion of the mounting portion 90. The strap 116 is secured at the fixing portion 122 to the flange portion 36 of the base plate 24 together with the front wall portion of the mounting portion 90 by staking the rivets 46.

When pressure is applied to the horn actuation area of the cover 78 shown in FIG. 2, the horn actuation area is flexibly deflected downward so that the projections 112 on the inner surface 92 behind the horn actuation area deflected urge the body 126 of the membrane type switch 81 on the switch support portion 114 of the back panel 82. This causes the opposed conductive coating layers of the body 126 to contact with each other, then actuating the horn. In this condition, the deflection of the horn actuation area is facilitated by the provision of the main receptacle portion 106 having the reduced thickness. In addition, since the back panel 82 has a rigidity not less than the lid portion 88 of the cover 78, the back panel 82 provides a rigid pressure surface at the switch support portion 114. Therefore, the membrane type switch 81 is quickly responsive to a relatively small pressure applied to the horn actuation area. This provides a driver of the vehicle with a good feeling when the driver depresses the horn actuation area. Further, the retainer 30 assists the back panel 82 in supporting the switch support portion 114 on the end wall portion 74, causing a suitable reaction force against the pressure applied to the horn actuation area. The retainer 30 also serves for improving the depressing feeling.

When the folded inflatable airbag 28 deploys, the airbag portion 62 hits the switch assembly 80 and the lid portion 88 of the cover 78. As shown in FIG. 2, the flap portions 84 and 86 are forcedly separable from the lid portion 88 and moveable from its normal closed position indicated in the solid line to its open position indicated in the phantom line and the back panel 82 with the membrane type switch 81 is forcedly rotatable about the hinge line and moveable from a normal closed position indicated in a solid line to an open position indicated in a phantom line. Since the back panel 82 with the membrane type switch 81 is secured to not the flap portion 84 but the base plate 24, the back panel 82 with the membrane type switch 81 is moved independently of the flap portion 84 to the open position angularly smaller than the open position of the flap portion 84 as seen from FIG. 2. Thus, the back panel 82 with the membrane type switch 81 is free from a stress caused at the open position of the flap portion 84. Further, the back panel 82 with the membrane type switch 81 independently moveable of the flap portion 84 permits the movement of the flap portion 84 without disturbing. This arrangement of the switch assembly 80 allows smooth and quick deployment of the folded inflatable airbag 28. In addition, in this embodiment, since the switch support portion 114 of the back panel 82 has an arcuate peripheral edge extending adjacent along the laterally extending portion 98 of the easy-to-break line 96 and the front part of the traversing portions 100 thereof, the back panel 82 assists split along the easy-to-break line 96 at its initial stage of the separation of the flap portion 84 from the lid portion 88 in response to deployment of the folded inflatable airbag 28.

The back panel and the membrane type switch may be connected together in a suitable manner such as bonding, welding, or by both coupling members and bonding or welding.

The back panel may be provided with doubled ribs including an inner rib and an outer rib spaced apart from the inner rib at a predetermined distance, instead of the rib 118 of the switch support portion 114 of the back panel 82 of the first embodiment. The predetermined distance is greater than a radial thickness of the rib 108 of the switch assembly receptacle portion 104 of the lid portion 88 of the cover 78. Upon mounting the back panel to the cover 78, the rib 108 is inserted between the inner and outer ribs. This arrangement serves for preventing relative displacement of the back panel and the lid portion 88 of the cover 78 upon depressing the horn actuation area.

The switch assembly is not limited to the first embodiment described above and may be modified as explained hereinbelow.

Figure 6:
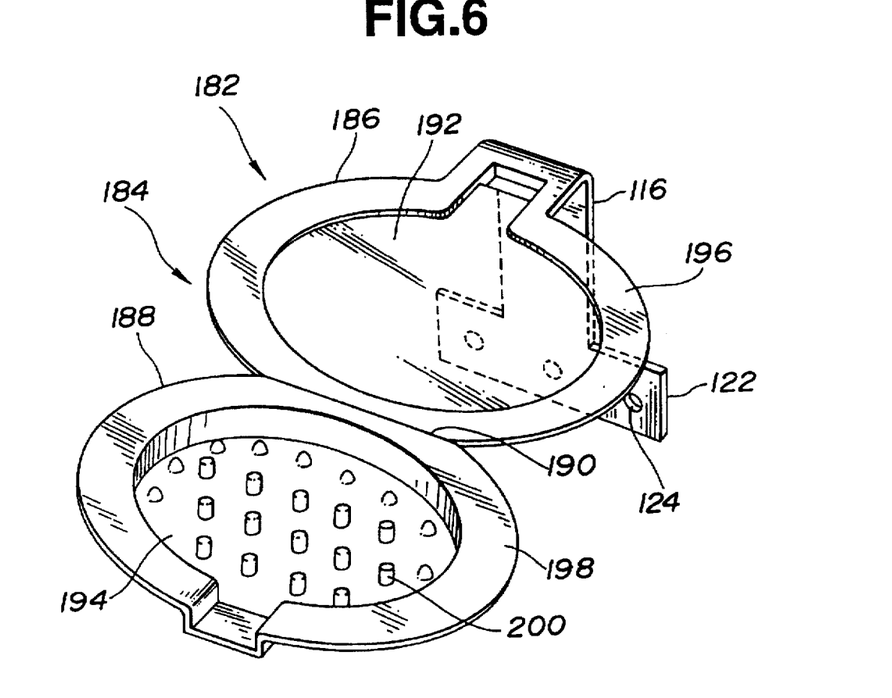
FIG. 6 is a perspective view of a modified back panel.

Referring to FIG. 6, a second embodiment of the switch assembly is now explained, which is similar to the first embodiment except that a modified back panel 182 has a switch support portion 184. Like reference numerals denote like parts and therefore detailed explanations therefor are omitted.

As illustrated in FIG. 6, the back panel 182 includes a generally letter 8-shaped switch support portion 184 having a lower half 186 and an upper half 188 formed integrally with and hinged to the lower half 186 at 190. The lower and upper halves 186 and 188 are of a generally ellipsoidal shape substantially same in size at their peripheries. The lower and upper halves 186 and 188 have recessed portions 192 and 194 in opposed relation to each other. A membrane type switch of the second embodiment is similar to the first embodiment except that a body thereof has no tabs at its peripheral edge and therefore detailed explanations therefor are omitted. The body of the membrane type switch is engageable with the recessed portions 192 and 194 of the lower and upper halves 186 and 188 of the back panel 182. Upon assembly, the upper half 186 is bent at the hinged portion 190 and overlapped on the lower half 188 so as to hold the body of the membrane type switch therebetween and then the lower and upper halves 186 and 188 are connected together at their peripheral portions 196 and 198 in a suitable manner, for instance, high frequency heat welding. Thus, the body of the membrane type switch is supported in the interposed state between the lower and upper halves 186 and 188. The upper half 188 is smaller in thickness than the lower half 186 so as to be more flexible in response to pressure applied to the horn actuation area of the cover 78. This serves for increasing an operating feeling when the driver depresses the horn actuation area. At least one of the lower and upper halves 186 and 188 is formed at the recessed portion 192 and 194 with a plurality of projections. In this embodiment, the upper half 188 has a plurality of post-shaped projections 200 extending uprightly from the recessed portion 194. The projections 200 may be modified in shape, for example, a rectangular brick shape. The provision of the projections 200 serves for increasing a performance of the membrane type switch in response to pressure applied to the horn actuation area and improving an operating feeling of the driver. The lower and upper halves 186 and 188 may be formed as separate parts and coupled together after inserting the membrane type switch therebetween. In such a case, the upper half 188 is made of a soft thermoplastic elastomer and the lower half 186 is made of a material relatively harder than the soft thermoplastic elastomer.

Figure 7:
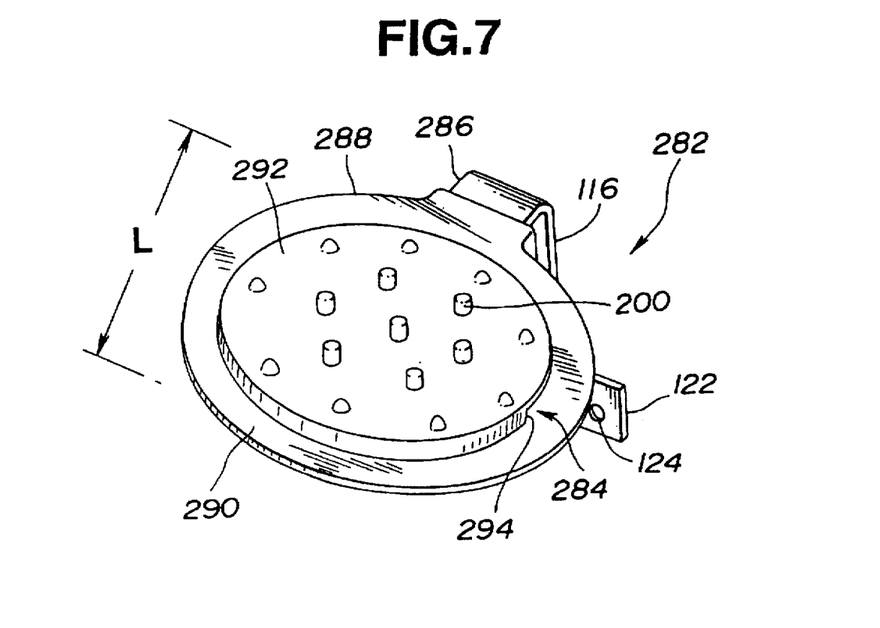
FIG. 7 is a perspective view of a further modified back panel.

Referring to FIG. 7, a third embodiment is now explained, in which a further modified back panel 282 is similar to the back panel 182 of the second embodiment except provision of a pocket-like receptacle portion 284 on an upper half 288 overlapped on a lower half 286.

As illustrated in FIG. 7, the upper half 288 has a base portion 290 and an outward swelled hollow portion 292 extending outward from the base portion 290. The outward swelled hollow portion 292 is formed with a cutout 294 having substantially a half of a length L indicated in FIG. 7. By the provision of the cutout 294, the pocket-like receptacle portion 284 is formed between the base portion 290 and the outward swelled hollow portion 292. The body of the membrane type switch is inserted into the pocket-like receptacle portion 284 via the cutout 294. Thus, the pocket-like receptacle portion 284 acts as coupling member for connecting the membrane type switch to the back panel 282. Further, the upper half 288 is formed with the projections 200 on its upper surface and engaged in the main receptacle portion 106 of the switch assembly receptacle portion 104 of the lid portion 88 of the cover 78.

Figure 8:
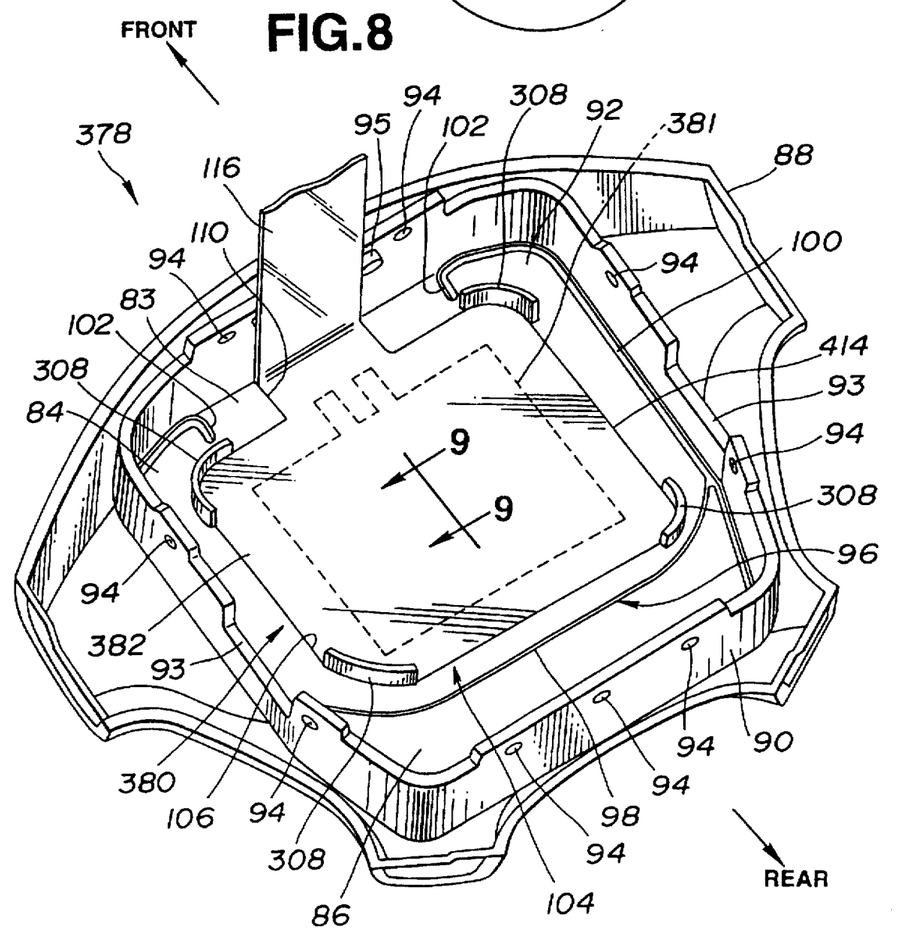
FIG. 8 is a bottom perspective view of a modified flexible airbag module cover and a modified switch assembly disposed thereon.
Figure 9:
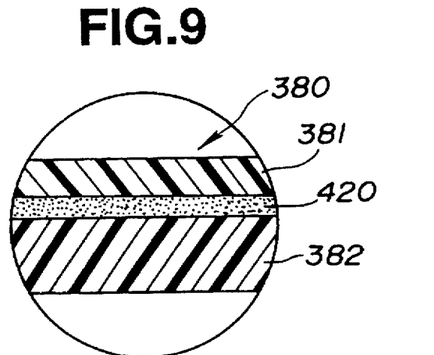
FIG. 9 is a fragmentary enlarged section of the modified switch assembly, taken along the line 9—9 of FIG. 8.

Referring to FIGS. 8 and 9, a fourth embodiment of the invention is now explained, which is similar to the first embodiment except that a modified flexible airbag module cover 378 has corner ribs 308 engaging a modified switch assembly 380. Like reference numerals denote like parts and therefore detailed explanations therefor are omitted.

As illustrated in FIG. 8, the corner ribs 308 are disposed adjacent four corner portions of the rectangular main receptacle portion 106 of the switch assembly receptacle portion 104. The corner ribs 308 have a rounded generally L-shaped plan view and substantially engage round corner edges of a generally rectangular switch support portion 414 of a back panel 382 of the switch assembly 380. Two of the corner ribs 308 which are disposed at the front corner portions of the front flap portion 84, may extend along the stop portions 102 of the easy-to-break line 96 and terminate within the tongue portion 83. The two corner ribs 308 serve for reinforcing the tongue portion 83 to which the flap portion 84 is hinged. The switch support portion 414 retains a membrane type switch 381 having a generally rectangular periphery as indicated in a phantom line of FIG. 8. The membrane type switch 381 is attached to the switch support portion 414 by using a bond. FIG. 9 shows the bond 420 disposed between the membrane type switch 381 and the switch support portion 414.

Figure 10:
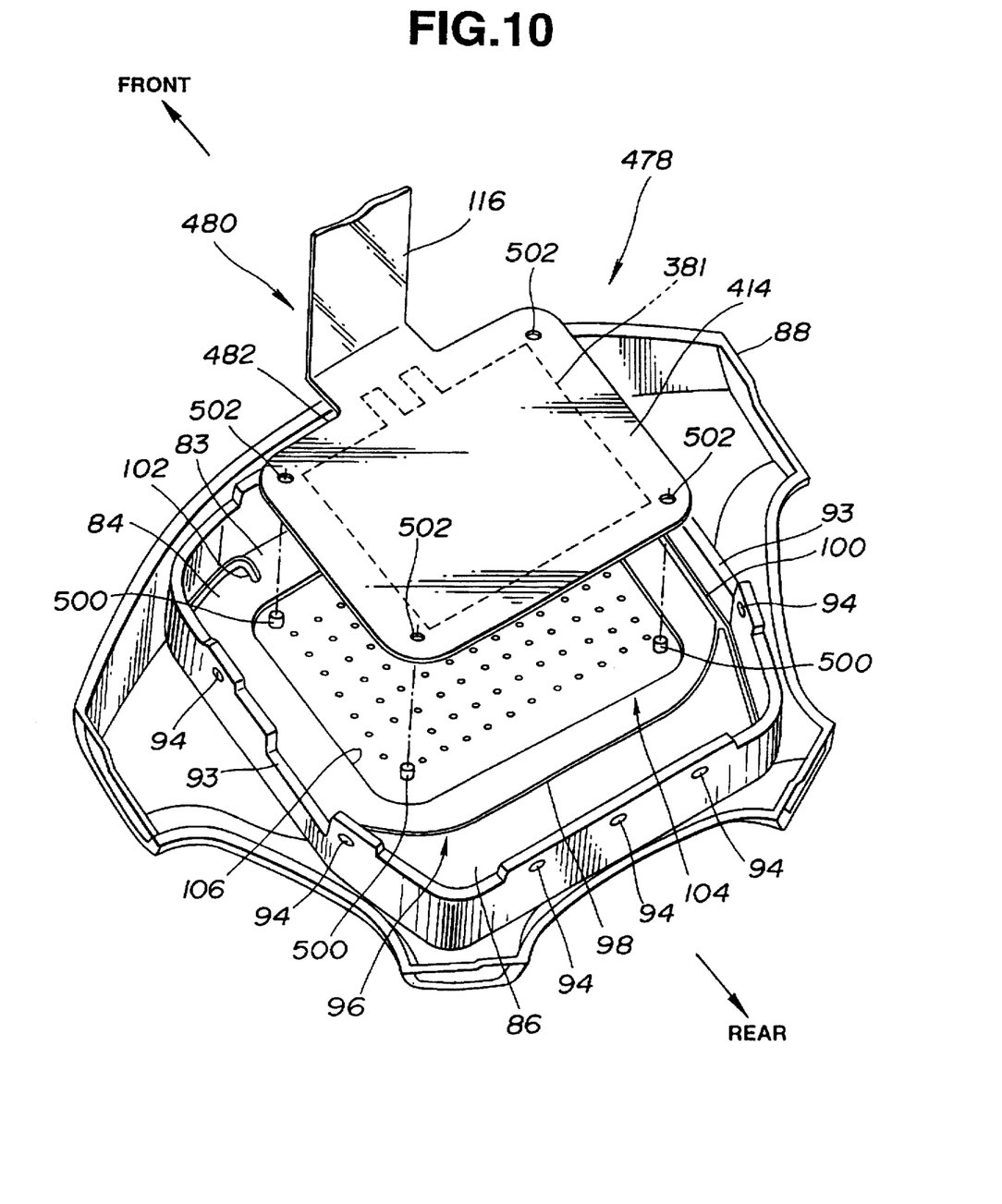
FIG. 10 is a bottom perspective view of a further modified flexible airbag module cover and a further modified switch assembly.

Referring to FIG. 10, a fifth embodiment of the invention is now explained, which is similar to the fourth embodiment except that a flexible airbag module cover 478 has pins 500 and a back panel 482 of a switch assembly 480 has holes 502 engageable with the pins 500.

As illustrated in FIG. 10, the flexible airbag module cover 478 has four pins 500 at four corner portions of the main receptacle portion 106. The four pins 500 are smaller in diameter than the holes 502 disposed at four corner portions of the switch support portion 414 of the back panel 482. Thus, the pins 500 are loosely engaged in the corresponding holes 502. When the switch support portion 414 with the membrane type switch 381 is moved from the normal closed position to the open position in response to inflation of the folded inflatable airbag 28, the pins 500 easily remove from the corresponding holes 502 to allow smooth separation of the flap portion 84 and quick deployment of the airbag 28.

As described above, the arrangement of the flexible airbag module cover and the switch assembly allows a rotational movement of the switch assembly independent of the flap portions of the cover, serving for a smooth and quick deployment of the folded inflatable airbag.

The arrangement also contributes to an increased performance of the membrane type switch and a good feeling upon depressing the horn actuation area.

In addition, the occupant restraint system of the invention can be readily assembled. Especially, an assembling operation of the switch assembly and the positioning thereof on the flexible airbag module cover can be facilitated as well as the mounting operation thereof to the base plate together with the flexible airbag module cover.

What is claimed is:

1. In an occupant restraint system, a base plate;

a folded inflatable airbag mounted to said base plate;

a flexible airbag module cover mounted to said base plate to cover said folded inflatable airbag, said flexible airbag module cover including a flap portion forcedly separable from said flexible airbag module cover and moveable from a normal closed position to an open position in response to inflation of said folded inflatable airbag, said flap portion having a horn actuation area;

a membrane type switch disposed behind the horn actuation area; and a back panel disposed between said folded inflatable airbag and said flexible airbag module cover, said back panel having a switch support portion retaining said membrane type switch and a strap secured to said base plate, said strap extending from the switch support portion.

2. An occupant restraint system as claimed in claim 1, wherein said back panel is not less than said flexible airbag module cover in rigidity.

3. An occupant restraint system as claimed in claim 1, wherein said flexible airbag module cover has means for positioning said back panel with said membrane type switch relative to said flexible airbag module cover.

4. An occupant restraint system as claimed in claim 3, wherein said means includes a rib disposed on the flap portion of said flexible airbag module cover to be engaged with the switch support portion of said back panel.

5. An occupant restraint system as claimed in claim 3, wherein said means includes pins and holes receiving the pins, said pins being disposed on one of the flap portion of said flexible airbag module cover and said back panel, said holes being formed on the other thereof.

6. An occupant restraint system as claimed in claim 3, wherein said means includes a recessed portion which is disposed on the flap portion of said flexible airbag module cover to receive said back panel.

7. An occupant restraint system as claimed in claim 1, wherein the flap portion of said flexible airbag module cover has a receptacle portion receiving said back panel with said membrane type switch, said receptacle portion being reduced in thickness.

8. An occupant restraint system as claimed in claim 1, further comprising retainer means for retaining the switch support portion of said back panel therebehind, said retainer means having a swelled portion extending toward the switch support portion.

9. In an occupant restraint system,
a base plate;
a flexible cover mounted to said base plate, said flexible cover including a flap portion forcedly separable from said flexible cover and moveable from a normal closed position to an open position, said flap portion having a switch actuation area; and
a switch assembly including a membrane type switch disposed behind the switch actuation area, and a back panel;
said back panel having a switch support portion retaining said membrane type switch and a strap secured to said base plate, said strap extending from the switch support portion.

10. An occupant restraint system as claimed in claim 9, wherein said back panel is not less than said flexible cover in rigidity.

11. An occupant restraint system as claimed in claim 9, wherein said flexible cover has means for positioning said back panel with said membrane type switch relative to said flexible cover.

12. An occupant restraint system as claimed in claim 11, wherein said means includes a rib disposed on the flap portion of said flexible cover to be engaged with the switch support portion of said back panel.

13. An occupant restraint system as claimed in claim 11, wherein said means includes pins and holes receiving the pins, said pins being disposed on one of the flap portion of said flexible cover and said back panel, said holes being formed on the other thereof.

14. An occupant restraint system as claimed in claim 11, wherein said means includes a recessed portion which is disposed on the flap portion of said flexible cover to receive said back panel.

15. An occupant restraint system as claimed in claim 9, wherein the flap portion of said flexible cover has a receptacle portion receiving said back panel with said membrane type switch, said receptacle portion being reduced in thickness.

16. An occupant restraint system as claimed in claim 9, further comprising retainer means for retaining the switch support portion of said back panel therebehind, said retainer means having a swelled portion extending toward the switch support portion.

17. An occupant restraint system as claimed in claim 9, wherein the switch actuation area is a horn actuation area.

* * * * *